March 21, 1967

R. G. ECKARD ET AL 3,309,921

SOLID BLOCK TRANSDUCER

Filed Feb. 14, 1964

2 Sheets-Sheet 1

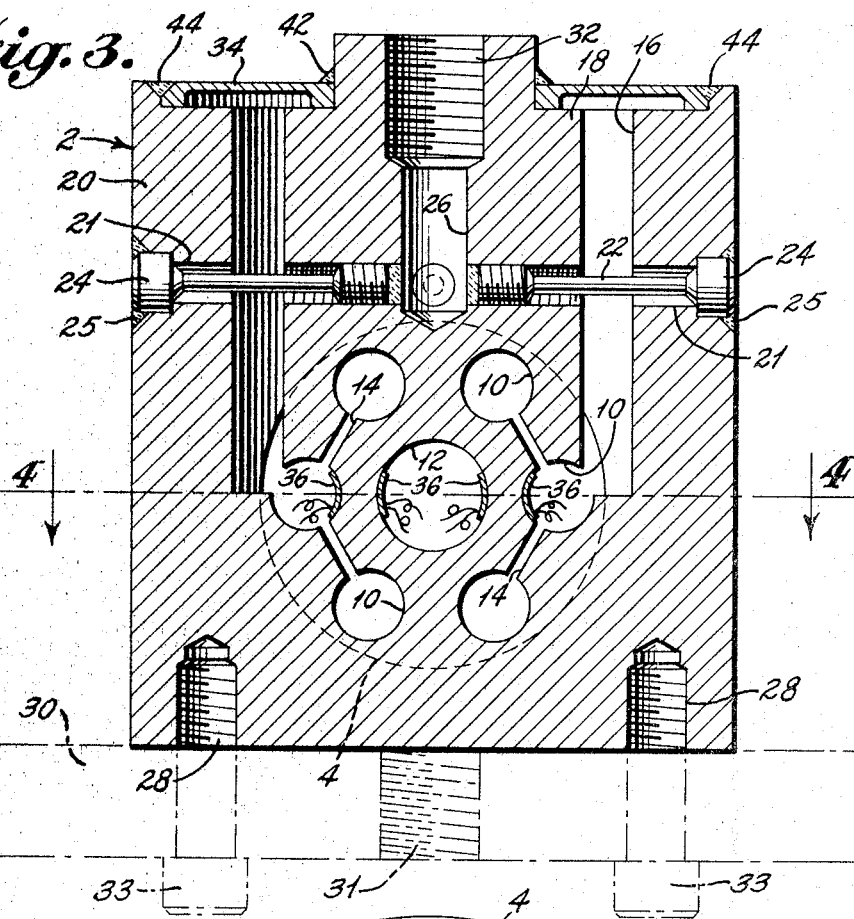
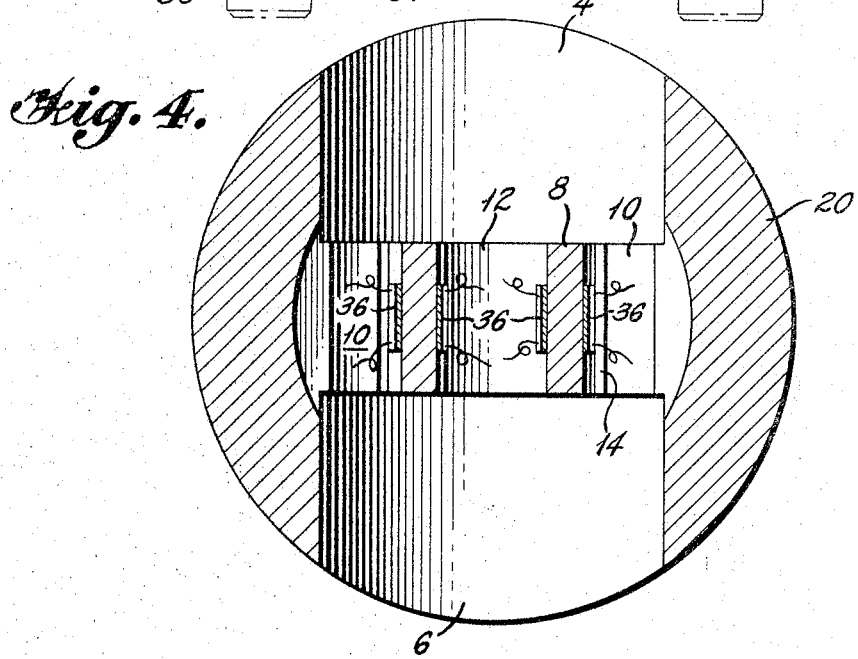

United States Patent Office 3,309,921
Patented Mar. 21, 1967

3,309,921
SOLID BLOCK TRANSDUCER
Ronald G. Eckard and Wilford Johns, Cumberland, Md., assignors, by mesne assignments, to Toroid Corporation, Huntsville, Ala., a corporation of Alabama
Filed Feb. 14, 1964, Ser. No. 345,009
5 Claims. (Cl. 73—141)

This invention relates to an integral load-sensing element for a load transducer.

Load-sensing devices are known in which a strain-sensing element is loaded in tension or compression and the strain is measured to give an indication of the load by electrical signal which is usually the output of a bridge circuit.

In the past such devices have been made of separate metal parts which are then assembled and welded into a unitary structure. The machine and assembling operations are costly, and introduce manufacturing tolerances which have an adverse effect on the precision of the completed load-sensing element. The welded joints may introduce a discontinuity in the metal which, in turn, affects the strain pattern in the load-sensing element.

It is an object of this invention to produce a load-sensing element which can be made in one piece by simple machine operations and which requires no precision assembly.

It is a further object of the invention to provide a load-sensing member which has definite zones of maximum strain.

It is a further object of this invention to provide a load-sensing member which is sensitive in the loading direction but rigid in directions lateral thereto.

Figure 1:
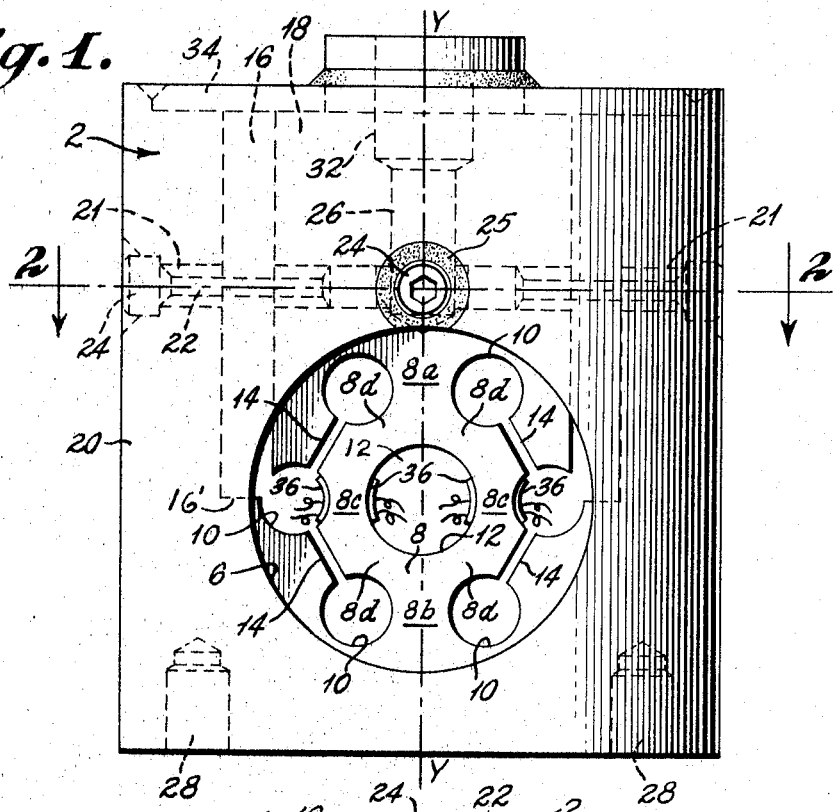
Figure 2:
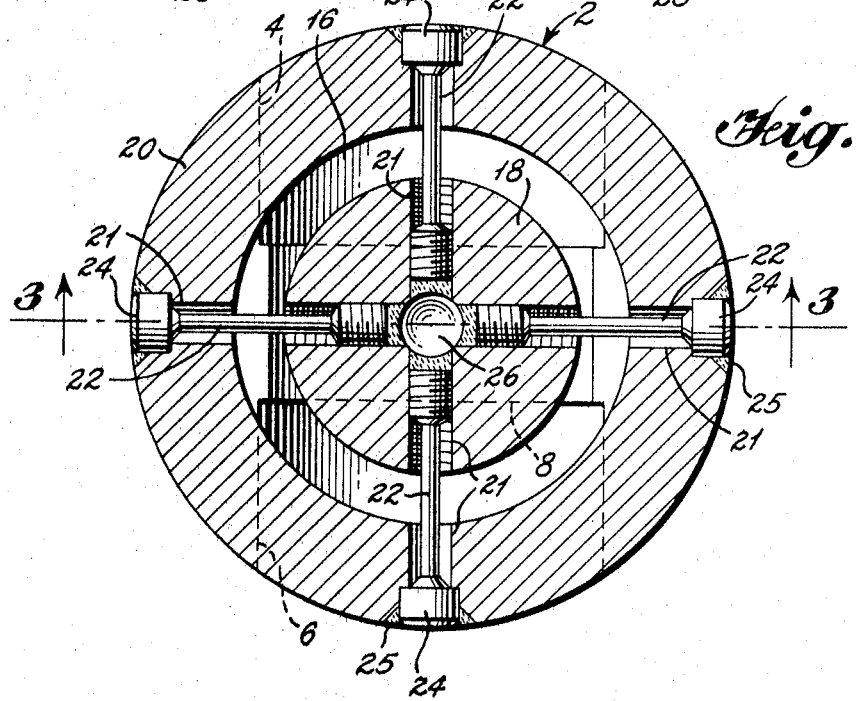

An understanding of the invention can be had by referring to the following detailed description of the accompanying drawings wherein:

FIG. 1 is a side view of the device made according to the invention.
FIG. 2 is a section taken on the line 2—2 of FIG. 1.
FIG. 3 is a section taken on the line 3—3 of FIG. 2.
FIG. 4 is a section taken on the line 4—4 of FIG. 3.

A cylindrical body 2 is bored normal to the cylindrical axis of the cylinder as shown at 4 and 6 to provide a web portion 8. Web portion 8 is drilled as shown at 10 and 12. Slots 14 interconnect holes 10 so that the portion of the web around hole 12 is supported at sections 8a and 8b along the load axis. Thin sections 8c are symmetrical and so arranged that the compression and tension strains on the inside and outside of thin sections 8c are substantially equal. Thin sections 8d form flexures or hinges so that when load is applied along the axis Y—Y, it is transformed into bending at sections 8c.

An annular groove 16 is milled in one end of cylinder 2 to a depth shown at 16' to provide a load applying cylinder 18 which is flexibly connected to the supporting cylinder 2 by web 8 by portions 8a and 8b.

Holes 21 are drilled in cylinder 2 and load applying cylinder 18. The inner ends of holes 21 are threaded to receive the threaded ends of flexible rods 22. The outer ends of rods 22 are also threaded and secured in tension by means of nuts 24.

Cylinder 18 is formed with a threaded opening 32 for connection with a load. Hole 26 is drilled at the bottom of threaded opening 32 to intersect holes 21. Rods 22 are threaded in holes 21 and nuts 24 are tightened to put rods 22 in tension. Rods 22 are then welded or brazed in place in cylinder 18 through openings 26 and 32 which allow access for the welding or brazing operation. The nuts are welded or brazed to cylinder 2 as shown at 25. The tension rods 22 exert a high restraint against lateral movement of cylinder 18 but allow the necessary longitudinal movement along the load axis Y—Y.

Cylinder 2 is provided with threaded openings 28 for connection with a base member. If desired a base 30 (shown in dashed outline) may be secured to the housing by threaded fasteners 33 and the base connected to the load-supporting member by means of threaded openings 31.

Strain gauges 36 are secured to web 8 on each edge of section 8c, and then are connected in a common electrical circuit, usually a Wheatstone bridge.

A flexible annular end plate 34 is secured to cylinder 18 and cylinder 2 by welding as shown at 42 and 44 and serves as a dirt cover.

It will be seen from the above that the load sensing element may be formed from a cylindrical block which forms both the housing for securing the lateral supports thereto and provides a load-sensing element that is homogeneous and free from welds in the critical load-sensing portions. Lateral stabilization of the load-sensing element is provided by radial rods which permit compression or tension load deflection along the load axis Y—Y but practically eliminates lateral components of a load, under conditions of eccentric loading, that is, loading not aligned with the load axis of the device.

While a single preferred embodiment of the invention has been shown and described, other obvious modifications will become apparent to those skilled in the art without departing from the scope of the invention as defined in the following claims.

What is claimed is:

1. Apparatus for use in a load-sensing device, said apparatus comprising a cylindrical block having an axis of revolution, said central hole being counterbored from extending through said block perpendicular to said axis of revolution, said central hole being counterbored from each side to form a web symmetrically placed in said block with respect to said axis of revolution, a first pair of holes formed in said web on each side of said central hole and being symmetrically placed with respect to said central hole and on an axis perpendicular to said axis of revolution and extending through the center of said central hole, second and third pairs of holes formed in said web and being symmetrically placed on each side of said axis of revolution with said second pair of holes above and said third pair of holes lower than said first pair of holes, slots formed interconnecting said holes of said first, second and third pairs of holes in said web on the same side of said axis of revolution, a cylindrical slot formed in one end of said cylindrical block to a depth intersecting said first pair of holes, the inner diameter of said cylindrical slot being such that said cylindrical slot intersects said first pair of holes to form a load applying cylinder, the portions of said web along said axis of revolution connecting said load applying cylinder, said web and the outer portion of said cylindrical block.

2. The apparatus according to claim 1 with strain gauges mounted on said web within said central hole, said strain gauges being disposed symmetrically about said axis of revolution and about said axis perpendicular thereto on which said first pair of holes are placed.

3. The apparatus according to claim 1 including a plurality of radial extending rods interconnecting said load applying cylinder and the portion of said cylindrical block exterior thereof, said radial rods maintaining the axis of said load applying cylinder concentric with said axis of revolution.

4. The apparatus according to claim 3 in which said radial rods, respectively, are in tension.

5. A load sensing device comprising a cylindrical block of metal having an axis of revolution, said block having a hole extending therethrough perpendicular to said axis, said block being counterbored to equal depths from each end of said hole to form a web portion, said web portion having a plurality of openings formed therein which are equally spaced from and symmetrically disposed with respect to said hole, first and second of said openings being above said hole and equally spaced from and on opposite sides of said axis, third and fourth of said openings being aligned with said hole on opposite sides thereof, fifth and sixth of said openings being below said hole and equally spaced from and on opposite sides of said axis, the first, third and fifth of said openings being on the same side of said axis, said web portion having a plurality of slots formed therein, slots on one side of said axis interconnecting said first, third and fifth openings and slots on the other side of said axis interconnecting said second, fourth and sixth openings, said block having a centrally located load applying portion and an outer support portion formed by a cylindrical slot in one end of said block, said cylindrical slot being concentric with said axis and the inner bottom portion of said cylindrical slot intersecting said third and fourth openings, whereby a load to be sensed applied to said centrally located load applying portion will stress certain parts of said web portion and the stressed web portion parts afford surfaces for the mounting of strain gauges.

References Cited by the Examiner
UNITED STATES PATENTS

| | | | |
|---|---|---|---|
| 2,561,318 | 7/1951 | Ruge | 73—141 X |
| 2,796,503 | 6/1957 | Ward | 73—141 X |
| 2,814,946 | 12/1957 | Harris | 73—141 |

RICHARD C. QUEISSER, *Primary Examiner.*

C. A. RUEHL, *Assistant Examiner.*